A. GORDON.
Cultivator.
No. 63,717.
Patented Apr. 9, 1867.
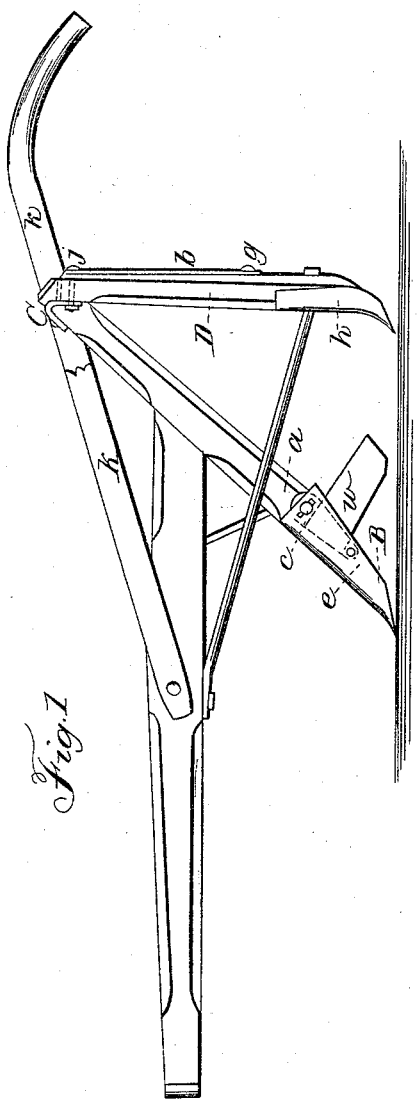
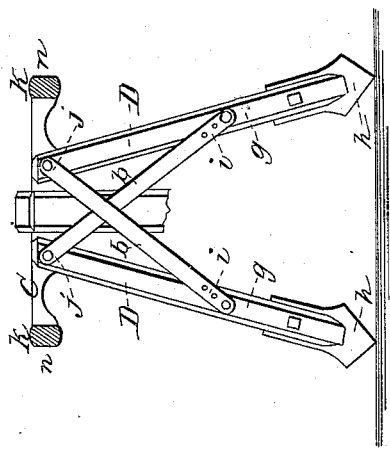
Witnesses.
Wm L Loughborough
A H Billings
Inventor
Alex Gordon

United States Patent Office.

ALEXANDER GORDON, OF ROCHESTER, NEW YORK, ASSIGNOR TO H. D. GORDON, OF THE SAME PLACE.

Letters Patent No. 63,717, dated April 9, 1867.

IMPROVEMENT IN CULTIVATORS.

The Schedule referred to in these Letters Patent and making part of the same.

TO ALL WHOM IT MAY CONCERN:

Be it known that I, ALEXANDER GORDON, of Rochester, in the county of Monroe, and State of New York, have invented certain new and useful "Improvements in Horse Hoes;" and I do hereby declare that the following is a full, clear, and exact description thereof, reference being had to the accompanying drawings, making part of this specification, in which—

Figure 1 is a side elevation of my invention.
Figure 2 is a rear view of a portion of the same.
Like letters indicate corresponding parts.

The drawings and claims fully indicate the nature of this invention. To enable others to make and use the same, I will describe its construction and operation.

I attach the wings $w$ of the ordinary horse hoe to the mould-board B by means of clamping-plates, $a$, shown by dotted lines in fig. 1. These plates are pivoted to the mould-board at $e$, and the upper end is provided with a slot, through which the body of the clamping-bolt $c$ passes. The wings $w$ are fitted snugly to a recess formed in the clamping-plates to receive them. When the clamping-plates are screwed up against the back or under side of the mould-board the wings are firmly held in position. They may be extended longitudinally or contracted by loosening the clamping-bolt $c$. The outer end of the rings may be elevated or depressed, as may be desired, while the bolts are loose, by the top of the clamping-plate swinging upon the pivot $e$. I provide the bars D of the side hoes or teeth $h$ with oblique or diagonal braces, $b$, the upper end being bolted to one bar, and the lower end to the other, which rigidly fixes their adjustment with relation to each other and to the central plough. The hoes $h$ may be spread or contracted by changing the bolt $g$ into the different holes $i$. The cross-bar or tie C may be made of cast iron, and in skeleton form, as shown in fig. 1. The bars or braces $b$ are attached to this bar by short bolts, $j$, which also secure the upper end of the braces $b$. The handles $k$ are attached to it by the bolts $n$, fig. 2. This is a much more substantial attachment for these parts than the wooden bar ordinarily used for this purpose.

What I claim as my invention, and desire to secure by Letters Patent, is—

1. The adjustable or swinging clamps $a$, in combination with the mould-board B, for the purpose of holding the wings $w$, substantially as shown and for the purposes specified.

2. The skeleton metallic cross-bar or tie C, constructed as shown and described, and arranged in connection with the shovel and teeth or hoe standards, for the purpose set forth.

3. The diagonal guide or extension bars $b$, in combination with the teeth bars D, as shown and described.

ALEX. GORDON.

Witnesses:
WM. S. LOUGHBOROUGH,
A. H. BILLINGS.